Feb. 19, 1952     B. H. SMITH ET AL     2,586,393
PRESSURE MEASURING APPARATUS
Filed May 5, 1948
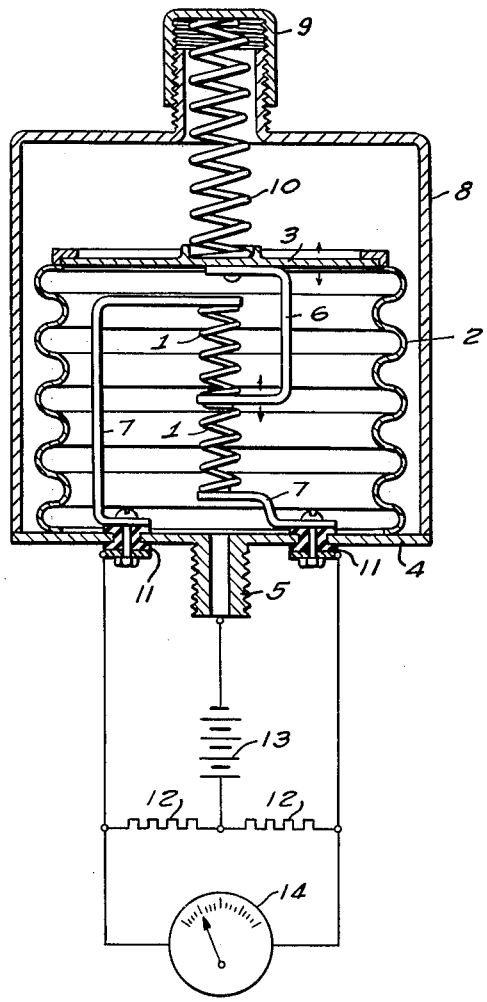
WITNESSES:
INVENTORS
Benjamin H. Smith and
George W. Rosenberger.
BY
Paul E. Friedemann
ATTORNEY Patented Feb. 19, 1952

2,586,393

UNITED STATES PATENT OFFICE 2,586,393

PRESSURE MEASURING APPARATUS

Benjamin H. Smith and George W. Rosenberger, Bloomfield, N. J., assignors to Westinghouse Electric Corporation, East Pittsburgh, Pa., a corporation of Pennsylvania Application May 5, 1948, Serial No. 25,268

13 Claims. (Cl. 73—398)

This invention relates generally to an apparatus of the type responsive to physical quantities and more in particular to an electro-mechanical device usable in the detection or measurement of physical quantities.

One object of this invention is to provide an apparatus responsive to a physical quantity which is simple in its elements and positive in operation.

Another object of this invention is to provide an electro-mechanical device sensitive to a physical quantity but which is yet relatively insensitive to excursions in energizing voltage.

A further object of this invention is to provide an apparatus responsive to a physical quantity embodying a normally balanced electrical network in which mechanical apparatus responsive to the physical quantity to be measured is employed to control the balance of the electrical network.

More specifically, it is an object of this invention to provide a fluid pressure sensitive apparatus embodying electrically heated resistance wire means having a temperature coefficient of resistivity, in which the temperature of the resistance is controlled as a function of the fluid pressure and the wire resistance is employed to indicate the fluid pressure.

The foregoing statements are merely illustrative of the various aims and objects of this invention. Other objects and advantages will become apparent from a study of the following disclosure when considered in conjunction with the accompanying drawing in which the single figure thereof schematically illustrates a preferred embodiment of this invention.

By utilizing an electrical system for indicating a particular physical quantity to be measured, for instance, fluid pressure, an apparatus is obtainable which is durable insofar as structure is concerned and which is relatively easily installed. In general, the principle herein embodied is characterized in the use of suitable electrical resistance means having a temperature coefficient of resistivity. Such resistance means, for example, may be a nickel wire, the temperature of which is controllable by a suitable means which is responsive to the quantity to be measured. In the present instance the temperature control is obtained by forming the resistance wire so that portions of its wire length are in spaced relation with respect to other portions of its length. By passing a current through the wire of a magnitude sufficient to cause heating thereof and heating between the spaced wire portions, the wire temperature may be conveniently controlled by varying the spacing of the spaced wire portions. The particular manner in which this spacing control may be accomplished depends largely upon the type of physical quantity which is to be measured. For the measurement of fluid pressure, a flexible bellows or a Bourdon tube may be employed and its deflections due to fluid pressure utilized to deflect the resistance wire and produce a change in spacing of the spaced portions thereof.

The sensitivity of a device utilizing this principle may in effect be doubled by utilizing a pair of resistance wires of the type which have been described and causing deflections thereof in opposite senses with the quantity that is to be measured. Thus the resistance of one wire will be increased as the spacing of its spaced wire portion is changed in one sense while the resistance of the other resistance wire will be decreased as the spacing of its spaced wire portions is changed in an opposite sense. The difference of the resistances of the two resistor wires may therefore be measured in an electrical bridge circuit affording a convenient and accurate measurement of the particular physical quantity.

The particular manner in which this is accomplished for a fluid pressure indicator is indicated in the drawing in which the resistance wires, which may be of nickel or other suitable material affording a temperature coefficient of resistivity, are of the form of helical springs. These resistance wires 1 are enclosed within a flexible bellows 2, one end of which is sealed by a plate 3 and the remaining end of which is sealed by a supporting plate 4 having a suitable threaded nipple 5 with an opening therethrough affording communication with the chamber formed by the bellows. The threaded nipple 5 may be connected to any fluid system the pressure of which it is desired to measure. Variations in pressure of the fluid deflect the bellows 2 and cause movement of the plate 3 with respect to the supporting plate 4. This movement is utilized to oppositely deflect the two wire resistors 1.

As illustrated in the drawing, the resistors are mounted in coaxial or end to end relation. A bracket 6 which is secured to the plate 3 has its free extremity disposed between and connected to the confronting ends of the resistance wires 1. The remaining ends of the resistance wires are secured to supports 7, each of which is insulatedly fastened to the supporting plate 4. With this construction, movement of the plate 3 upwardly as viewed in the drawing deflects the upper resistance wire 1 in compression, thus decreasing the spacing of its helices. At the same time the lower resistance wire 1 is elongated and the spacing of its helices is increased.

The entire bellows is housed within a protective closure 8 having an externally threaded tubular section protruding from its top side as viewed. This tubular section is capped with a threaded cap 9 and a calibrating spring 10 is disposed between the cap 9 and the plate 3 of the bellows. The force exerted by the spring 10 upon the plate 3 acts oppositely to the force exerted on that plate by fluid pressure. Hence by suitable adjustment of the cap 9 an external spring force may be applied to the plate 3 sufficient to balance the fluid pressure force acting thereon to produce the required spacing of the helices of the resistance wires 1, that for a given heating current flow therethrough their resistances may be made equal, or brought to some relative value whereby the electrical network connected thereto may be balanced, or, if preferred adjusted to afford a predetermined degree of unbalance, depending upon requirements.

The support 6 is electrically connected to the plate 3 and this electrical connection continues to the plate 4 through the bellows 2. Supports 7 are insulated from the supporting plate 4 by means of the insulators 11. With this arrangement the wire resistors 1 form adjacent legs of an electrical bridge circuit, the remaining two adjacent legs are formed by resistors 12. A battery 13 having sufficient capacity to circulate a current in the bridge circuit of a magnitude to heat the wire resistors and cause heating between the helices thereof, is connected between the resistors 12 and the supporting plate 4, while a meter 14, which may be calibrated in terms of pressure with the zero position at the center, is connected across the remaining two terminals of the bridge circuit.

In general, the pressure indicator for a given fluid pressure will be adjusted to produce electrical balance of the bridge circuit at which time the indication of the meter 14 will be zero. Should the pressure change, the plate 3 of the bellows will move up or down depending upon whether the pressure has increased or decreased. Assuming a pressure increase and upward movement of the plate 3, the spacing of the helices of the upper resistor wire will be decreased while the helices of the lower resistor wire will be spaced farther apart. The resulting increased resistance in the upper resistor wire and decreased resistance in the lower resistor wire unbalances the electrical bridge circuit in one direction and the amount of unbalance or pressure increase is indicated on the meter 14. The operation is reversed when the pressure decreases.

Due to the thermal laws which govern the operation of this device, the system is practically independent of variations in source voltage over a normal working range, for instance, of plus or minus 10 per cent. Additionally, this device is readily adapted for application in the measurement of oil pressure in aircraft engines. When so connected to measure engine pressure, the resistance wires are immersed in the engine oil which fills the bellows. There is a very rapid response to pressure change due to the almost instantaneous change in resistor wire temperature as the helix spacing changes. When the helices are moved closer or farther apart, the heat radiation into the oil quickly strikes a heat balance. This occurs much more rapidly than if the wire resistors were used in open air. Due to the construction of this device the pressure sensitive bellows and also the wire resistors are well protected and the damping effect of the oil surrounding the wire resistors minimizes the possibility of injury to these elements due to severe vibrations encountered in engine applications.

While the preferred embodiment of this invention has been illustrated, it will be appreciated that numerous variations of the disclosed structure may be made without departing from the spirit and the scope of the invention. Accordingly, it is intended that the foregoing descriptive disclosure shall be considered only as illustrative of the principles of this invention.

We claim as our invention:

1. Apparatus responsive to a physical quantity comprising, in combination, a pair of resistor wires, each of a material having a temperature coefficient of resistivity and each being shaped to have portions of the wire disposed in spaced relation to other portions thereof, circuit means for causing a current to flow in each of said resistor wires of a magnitude to cause heating thereof and heating between the spaced portions thereof, means responsive to said physical quantity for differentially deflecting said resistor wires to increase the spacing of the spaced portions of one resistor wire while decreasing the spacing of the spaced portions of the other resistor wire, and means responsive to the differential of the resistances of said resistor wires.

2. Apparatus responsive to a physical quantity comprising, in combination, a pair of resistor wires each of a material having a temperature coefficient of resistivity and each being shaped to have portions of the wire disposed in spaced relation to other portions thereof, circuit means for causing a current to flow in each of said resistor wires of a magnitude to cause heating thereof and heating between the spaced portions thereof, said wires being arranged in end to end relation, a support connected between the confronting ends of said wires, a pair of supports, each joined to a remaining end of the resistor wires so that each remaining end is supported, means responsive to said physical quantity for effecting relative movement of said supports and oppositely deflecting said resistor wire while decreasing the spacing of the spaced portions of the other resistor wire, and circuit means responsive to the difference of the resistances of said resistor wires.

3. Apparatus responsive to the pressure of a fluid comprising, in combination, an electrical resistor of a material having a temperature coefficient of resistivity and being of substantially helical configuration, means constructed and arranged to form a flexible chamber, means for admitting said fluid into said chamber, means connecting said electrical resistor within said flexible chamber, for varying the spacing of the helices of the electrical resistor upon deflection of said flexible chamber with changes in pressure of said fluid, means for causing a current to flow in said electrical resistor of sufficient magnitude to cause heating thereof and heating between the adjacent helices thereof, for causing resistance variations with changes in helix spacing, and circuit means responsive to the resistance of said electrical resistor.

4. Apparatus responsive to the pressure of a fluid comprising, in combination, a flexible casing, means forming an opening into said casing for admitting fluid thereinto and causing deflection thereof, a resistor wire of a material having a temperature coefficient of resistivity and shaped to have portions of the wire disposed in spaced relation to other portions thereof, means attaching the extremities of said resistor to opposite points within said casing so that said resistor is deflected by deflection of said casing and the spacing of the spaced portions of the resistor wire varied in accordance with the deflection, circuit means for causing a current to flow in said resistor wire to cause heating thereof and heating between the spaced wire portions thereof, and circuit means responsive to the resistance of said resistor wire.

5. Apparatus responsive to the pressure of a fluid comprising, in combination, a flexible casing, means forming an opening into said casing for admitting a fluid thereinto and causing deflection thereof in dependence of the pressure of said fluid, a pair of resistor wires, each of a material having a temperature coefficient of resistivity and each being shaped to have portions of the wire thereof disposed in spaced relation to other portions thereof, said resistor wires being arranged end to end within said casing, support means connected between the confronting ends of said resistor wires and connected to one point on said casing, support means connected to the remaining end of each resistor wire and connected to an opposite point of said casing, said support means oppositely deflecting said resistor wires upon deflection of said flexible casing to increase the spacing of the spaced portions of one resistor wire while decreasing the spacing of the spaced portions of the other resistor wire, circuit means for causing a current to flow in each of said resistor wires of a magnitude to heat said wires and effect heating between the spaced portions of each thereof, and circuit means responsive to the difference of the resistances of said resistance wires.

6. Apparatus responsive to a physical quantity comprising, in combination, a pair of resistor wires, each of a material having a temperature coefficient of resistivity and each being shaped to have portions of the wire thereof disposed in spaced relation to other portions thereof, means responsive to said physical quantity for differentially deflecting said resistor wires and oppositely changing the spacing of the spaced portions of the respective wires, a bridge circuit including said resistor wires in adjacent legs thereof, circuit means energizing said bridge circuit and causing a current to flow therein of a magnitude to heat the resistor wires and effect heating between the spaced portions thereof, and circuit means responsive to the electrical unbalance of said bridge circuit.

7. Apparatus responsive to the pressure of a fluid comprising, in combination, a flexible bellows having an opening therein for admitting a fluid under pressure, at least one resistance wire of a material having a temperature coefficient of resistivity and being of the shape of a helical spring, mounting means securing said helical spring shaped resistance wire internally of said bellows to be stretched and compressed with expanding and contracting movements of said bellows in response to fluid pressure, circuit means for causing a current to flow in said resistance wire of a magnitude to cause heating thereof and heating between the helices thereof, and circuit means responsive to the resistance of said resistance wire.

8. Apparatus responsive to the pressure of a fluid comprising, in combination, a flexible bellows having an opening therein for admitting a fluid under pressure, a pair of resistance wires each of a material having a temperature coefficient of resistivity and each being of the shape of a helical spring, mounting means securing said helical spring shaped resistance wires internally of said bellows to effect opposite deflection thereof axially upon deflection of said bellows in response to fluid pressure, circuit means for causing a current to flow in said resistance wires of a magnitude to cause heating thereof and heating between the helices thereof, and circuit means responsive to the difference of the resistances of said resistance wires.

9. Apparatus responsive to a physical quantity comprising, in combination, a pair of resistor wires, each of a material having a temperature coefficient of resistivity and each being shaped to have portions of the wire thereof disposed in spaced relation to other portions thereof, energizing circuit terminals connected with the ends of said resistor wires, and means responsive to a physical quantity for increasing the spacing of the spaced wire portions of one resistor wire while decreasing the spacing of the spaced wire portions of the other resistor wire.

10. Apparatus responsive to the pressure of a fluid comprising, in combination, a flexible casing, means forming an opening into said casing for admitting a fluid thereinto and causing deflection thereof in dependence of the pressure of said fluid, a resistor wire of a material having a temperature coefficient of resistivity and being shaped to have portions of the wire thereof in spaced relation to other portions thereof, means supporting said resistor wire internally of said casing to be deflected in dependence of the deflection of said casing, and means forming energizing circuit terminals externally of said casing and connected internally of said casing with said resistor wire.

11. Apparatus responsive to the pressure of a fluid comprising, in combination, a flexible casing, means forming an opening into said casing for admitting a fluid thereinto and causing deflection thereof in dependence of the pressure of said fluid, a resistor wire of a material having a temperature coefficient of resistivity and being shaped to have portions of the wire thereof disposed in spaced relation to other portions thereof, means supporting said resistor wire internally of said casing to be deflected in dependence of the deflection of said casing, means forming energizing circuit terminals externally of said casing and connected internally of said casing with said resistor wire, and means for applying a mechanical bias to said flexible casing in a direction to afford calibration of said apparatus.

12. Apparatus responsive to the pressure of a fluid comprising, in combination, a flexible casing, means forming an opening into said casing for admitting a fluid thereinto and causing deflection thereof in dependence of the pressure of said fluid, a resistor wire of a material having a temperature coefficient of resistivity and being shaped to have portions of the wire thereof disposed in spaced relation to other portions thereof, means supporting said resistor wire internally of said casing to be deflected in dependence of the deflection of said casing, means forming energizing circuit terminals externally of said casing and connected internally of said casing with said resistor wire, a structure forming a chamber enclosing said flexible casing, and spring means disposed between said structure and said flexible casing for biasing said flexible casing in a direction opposite to the bias thereon due to the pressure of said fluid.

13. In measuring means for detecting a physical quantity, the combination of, an electrical heater wire of a material having a temperature coefficient of resistivity and being shaped to have portions of the wire disposed in spaced relation to other portions thereof, a fluid-tight flexible casing having an opening therein providing for the admission of a fluid medium into said casing, support means connecting said heater wire to said flexible casing at relatively displaceable points on said casing, and electrical terminal means externally of said casing connected at spaced points along said electrical heater wire.

BENJAMIN H. SMITH.
GEORGE W. ROSENBERGER.

REFERENCES CITED

The following references are of record in the file of this patent:

UNITED STATES PATENTS

| Number | Name | Date |
|---|---|---|
| 2,419,061 | Emery | Apr. 15, 1947 |

FOREIGN PATENTS

| Number | Country | Date |
|---|---|---|
| 12,770 | Great Britain | July 27, 1901 |
| 362,671 | Germany | Aug. 20, 1918 |
| 577,386 | France | Sept. 4, 1924 |